Patented Nov. 10, 1931

1,831,706

UNITED STATES PATENT OFFICE

ALPHONSE GAMS AND GUSTAVE WIDMER, OF BASEL, SWITZERLAND, ASSIGNORS TO THE FIRM SOCIETY OF CHEMICAL INDUSTRY IN BASLE, OF BASEL, SWITZERLAND

CONDENSATION PRODUCT OF CARBAMIDES AND ALDEHYDES AND PROCESS OF MAKING SAME

No Drawing. Application filed November 25, 1927, Serial No. 235,747, and in Switzerland December 4, 1926.

Our invention relates to the manufacture of porous condensation products of carbamides and aldehydes, and particularly of urea and formaldehyde. It comprises the process of making these products, the new products themselves, as well as the application of the new products in the industry of artificial materials.

It is known that porous artificial masses resembling meerschaum can be made from formaldehyde and urea by adding to the boiling aqueous solution of the mixed components a large proportion of acid to act as a catalyst, and pouring the foaming mass thus obtained directly into a mould (cf. British Patent No. 187,605). The products made in this manner have sundry disadvantages; on the one hand they are polymerized in a premature stage of condensation and on the other hand they contain a catalyst. The products are apt therefore to have too little solidity; they crack during storage and are easily broken.

This invention is based on the observation that products free from these disadvantages can be obtained on the one hand by starting from condensation products of higher stage, that is to say products which are condensed above the methylol urea phase, and on the other hand by separating subsequently the catalyst used in the polymerization.

A suitable condensation product is made for example by boiling for about 20 hours a neutral solution of 1 molecular proportion of urea and 2 molecular proportions of formaldehyde. When to such a condensation solution, which may be either concentrated or diluted, a sufficient quantity of an acidic polymerizing catalyst is added the whole reaction mixture including the solvent present sets to a solid jelly which is at first clear but soon becomes white and somewhat quickly becomes hard. Instead of water, another solvent, such as alcohol, may be used, whereby the jelly under some conditions may remain completely transparent for a long time and becomes turbid only at a later stage.

From the body thus obtained, the catalyst is separated by osmosis; an acid catalyst is preferably first rendered harmless by neutralization and then the neutral salt separated by washing. A more rapid method of purification is one depending on electroosmosis. It is in this manner possible within a few hours to obtain molded pieces of several centimetres thick which are free from electrolyte or other undesirable admixtures, for instance intermediate condensation products of low molecular weight.

In the manner described above products are made which, according to the concentration of the solutions used, consist of urea-formaldehyde - condensation - products containing more or less water or other solvent. This solvent must be separated by a further operation, for example by drying at a gentle heat.

The materials thus obtained have a more or less porous structure and a correspondingly low specific gravity which is wholly dependent on the proportion of the solvent used in the polymerization. When much solvent is used a specifically light product of density 0.4 or even less can be made. By pressing the products under high pressure, with or without application of heat, they can be made more dense and at the same time stronger.

The new materials are snow-white and either completely homogenous or, when certain catalysts are used, the product has a somewhat ivory speckling. Their degree of hardness can be greatly varied by varying the kind and proportion of catalyst used, as well as the kind of after-treatment; furthermore, the addition of softening agents or filling materials may determine the degree of hardness.

As softening agents or agents imparting elasticity may be named triarylphosphate, diethylphthalate, linseed oil or latex; as filling materials cellulosic materials, asbestos or kieselguhr. The products may be coloured in any suitable manner. Also there may be added to the mass a chemical reagent which may take part in the resin-formation, such as phenol, amine or urea.

According to the material added the addition may be made either to the solution undergoing condensation before polymerization or to the solid porous product after polymerization has occurred.

The new materials are characterised by high strength, toughness and high elasticity and can be worked by sawing, boring, cutting, turning and polishing. They are suitable for the production of artificial products of various kinds. Owing to their high capacity for insulating electricity and heat they are particularly valuable for these purposes.

The following examples illustrate the invention:—

*Example 1.*—A neutral solution of 600 parts by weight (1 mol.) of urea and 1500 parts by volume (2 mols.) of formaldehyde of 40 per cent. strength is boiled in a reflux apparatus until a sample when cold does not become turbid. The solution is then cooled, mixed with an equal volume of sulphuric acid of 1 per cent. strength and immediately poured into molds. After a few minutes the mass gelatinizes and after some hours becomes hard. It is now removed from the form and first immersed in dilute caustic soda solution for neutralizing the sulphuric acid, then washed until the electrolytes have been completely separated and finally dried. It is a snow-white, highly porous mass of density about 0.5.

*Example 2.*—600 parts by weight of urea are dissolved in 1500 parts by volume of formaldehyde of 40 per cent. strength. The solution is mixed with 60 parts by weight of blood charcoal and filtered. The clear solution is heated in an autoclave in boiling water for several hours. The clear condensation solution thus obtained is mixed with $\frac{1}{10}$ of its volume of an aqueous solution of aniline hydrochloride and urea (containing 2.5 parts of aniline hydrochloride and 3.2 parts of urea in 10 volumes of the solution), and is then poured into molds. The mixture gelatinizes after 8–10 minutes and after standing for about 4 hours it is made alkaline as described in Example 1, washed and dried. The density of the snow-white, finished product, which frequently has a fine ivory marking, is about 0.85. By subjecting this product to a pressure of a few 100 atmospheres, it is pressed without disruption and its density may attain 1.3 or more. Simultaneously its strength is increased.

*Example 3.*—The condensation solution described in Example 2 is evaporated at about 50° C. until it has a content of 75–80 per cent. of dry substance. 400 parts of this solution are mixed with 150 parts of finely subdivided asbestos, which has been previously treated with acid, washed until neutral and rubbed up with the smallest possible quantity of water, and the mixture is worked up to a homogeneous product. 100 parts by volume of a solution of aniline hydrochloride of 50 per cent. strength is mixed into the mass and the latter is cast into molds and further treated as described in Example 1. When dry it is a very solid homogeneous product of a density of about 0.9.

In all cases the products may be purified by electroosmosis, for instance in the following way:

Into a rectangular trough to the two front ends of which electrodes made from unattackable material (lead, carbon, etc.) have been attached, there are introduced the molded pieces in such a manner that the section of the trough is filled out as much as possible by the artificial material. The trough is then filled with water which is constantly replenished. The electrodes are then connected up with a continuous current of about 115 volts. The current intensity, which amounted to about 5 amperes at the start, falls down to about 0.8 ampere in the course of the purification process. As soon as constancy has been attained the purification is at an end.

*Example 4.*—200 parts by volume of the condensation solution obtained as described in Example 1 are mixed with 30 parts by volume of a solution of ammonium sulphocyanide of 10 per cent. strength and the mixture is poured into molds. It is worked up as described in Example 1 and is a product very similar to that described in that example but with a density of about 0.8 to 0.9.

What we claim is:—

1. A process for the manufacture of solid porous condensation products, substantially free from electrolytes, of carbamides and aldehydes, wherein to a solution of the condensation product from the carbamide and the aldehyde which has been condensed beyond the first stage of condensation there is added a quantity of an acidic catalyst sufficient to cause the whole condensation mixture including the solvent present to gelatinize without application of external heat whereupon the solid body thus obtained is allowed to harden and then freed from the catalyst.

2. A process for the manufacture of solid porous condensation products, substantially free from electrolytes, of carbamides and aldehydes, wherein to a solution of the condensation product from urea and formaldehyde which has been condensed beyond the first stage of condensation there is added a quantity of an acidic catalyst sufficient to cause the whole condensation mixture including the solvent present to gelatinize without application of external heat whereupon the solid body thus obtained is allowed to harden and then freed from the catalyst.

3. A process for the manufacture of solid porous condensation products, substantially free from electrolytes, of carbamides and aldehydes, wherein to a solution of the condensation product from the carbamide and the aldehyde which has been condensed beyond the first stage of condensation there is added a quantity of an acidic catalyst sufficient to cause the whole condensation mixture including the solvent present to gelatinize without application of external heat whereupon the solid body thus obtained is allowed to harden and then freed from the catalyst by electroosmosis.

4. A process for the manufacture of solid porous condensation products, substantially free from electrolytes, of carbamides and aldehydes, wherein to a solution of the condensation product from urea and formaldehyde which has been condensed beyond the first stage of condensation there is added a quantity of an acidic catalyst sufficient to cause the whole condensation mixture including the solvent present to gelatinize without application of external heat whereupon the solid body thus obtained is allowed to harden and then freed from the catalyst by electroosmosis.

5. A process for the manufacture of solid porous condensation products, substantially free from electrolytes, of carbamides and aldehydes, wherein to a solution of the condensation product from the carbamide and the aldehyde which has been condensed beyond the first stage of condensation there is added a quantity of an acidic catalyst sufficient to cause the whole condensation mixture including the solvent present to gelatinize without application of external heat whereupon the solid body thus obtained is allowed to harden, then freed from the catalyst, and subsequently subjected to pressure.

6. A process for the manufacture of solid porous condensation products, substantially free from electrolytes, of carbamides and aldehydes, wherein to a solution of the condensation product from urea and formaldehyde which has been condensed beyond the first stage of condensation there is added a quantity of an acidic catalyst sufficient to cause the whole condensation mixture including the solvent present to gelatinize without application of external heat whereupon the solid body thus obtained is allowed to harden, then freed from the catalyst, and subsequently subjected to pressure.

7. A process for the manufacture of solid porous condensation products, substantially free from electrolytes, of carbamides and aldehydes, wherein to a solution of the condensation product from the carbamide and the aldehyde which has been condensed beyond the first stage of condensation there is added a quantity of an acidic catalyst sufficient to cause the whole condensation mixture including the solvent present to gelatinize without application of external heat whereupon the solid body thus obtained is allowed to harden, then freed from the catalyst by electroosmosis, and subsequently subjected to pressure.

8. A process for the manufacture of solid porous condensation products, substantially free from electrolytes, of carbamides and aldehydes, wherein to a solution of the condensation product from the carbamide and the aldehyde which has been condensed beyond the first stage of condensation there is added an aromatic amine and a quantity of an acidic catalyst sufficient to cause the whole condensation mixture including the solvent present to gelatinize without application of external heat whereupon the solid body thus obtained is allowed to harden and then freed from the catalyst.

9. A process for the manufacture of solid porous condensation products, substantially free from electrolytes, of carbamides and aldehydes, wherein to a solution of the condensation product from urea and formaldehyde which has been condensed beyond the first stage of condensation there is added an aromatic amine and a quantity of an acidic catalyst sufficient to cause the whole condensation mixture including the solvent present to gelatinize without application of external heat whereupon the solid body thus obtained is allowed to harden, then freed from the catalyst by electroosmosis, and subsequently subjected to pressure.

10. As articles of manufacture the white to ivory colored solid porous condensation products, substantially free from electrolytes, from carbamides and aldehydes obtained by treating a solution of a condensation product of a carbamide and an aldehyde with a quantity of an acid catalyst sufficient to cause the whole condensation mixture including the solvent present to gelatinize, then allowing the solid body obtained to harden and eliminating the catalyst, said products, owing to their substantial freeness from electrolytes, being characterized by especially high strength, stability, toughness and elasticity and dielectric power.

11. As articles of manufacture the white to ivory colored solid porous condensation products, substantially free from electrolytes, from carbamides and aldehydes obtained by treating a solution of a condensation product of urea and formaldehyde with a quantity of an acid catalyst sufficient to cause the whole condensation mixture including the solvent present to gelatinize, then allowing the solid body obtained to harden and eliminating the catalyst, said products, owing to their substantial freeness from electrolytes, being characterized by especially high strength, stability, toughness and elasticity and dielectric power.

12. As articles of manufacture the white to ivory colored solid porous condensation products, substantially free from electrolytes, from carbamides and aldehydes obtained by treating a solution of a condensation product of a carbamide and an aldehyde with an aromatic amine and with a quantity of an acid catalyst sufficient to cause the whole condensation mixture including the solvent present to gelatinize, then allowing the solid body obtained to harden and eliminating the catalyst, said products, owing to their substantial freeness from electrolytes, being characterized by especially high strength, stability, toughness and elasticity and dielectric power.

13. As articles of manufacture the white to ivory colored solid porous condensation products, substantially free from electrolytes, from carbamides and aldehydes obtained by treating a solution of a condensation product of urea and formaldehyde with an aromatic amine and with a quantity of an acid catalyst sufficient to cause the whole condensation mixture including the solvent present to gelatinize, then allowing the solid body obtained to harden and eliminating the catalyst, said products, owing to their substantial freeness from electrolytes, being characterized by especially high strength, stability, toughness and elasticity and dielectric power.

In witness whereof we have hereunto signed our names this 14th day of November 1927.

ALPHONSE GAMS.
GUSTAVE WIDMER.